Jan. 22, 1946.　　　R. C. ALLEN　　　2,393,447
TURBINE BLADE LOCKING APPARATUS
Filed May 20, 1944
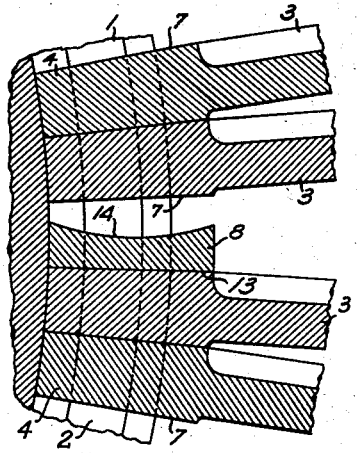
Fig. 4
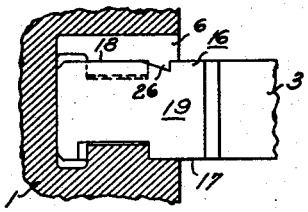
Fig. 9
Fig. 10
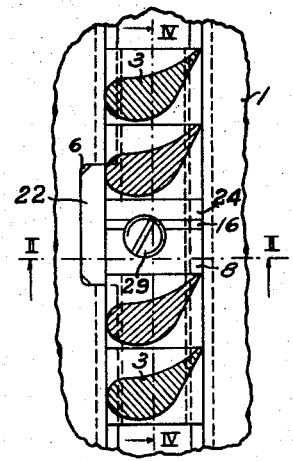
Fig. 1
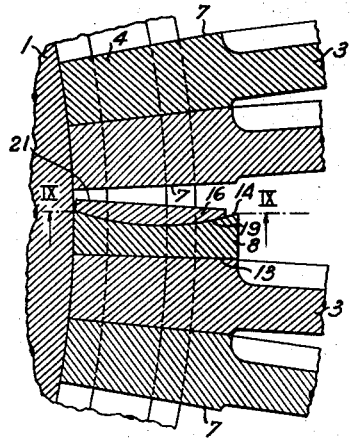
Fig. 5
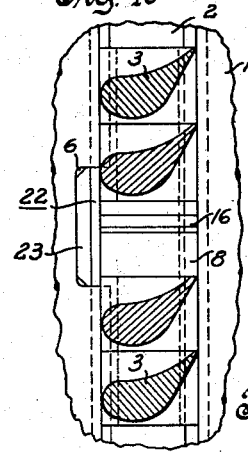
Fig. 6
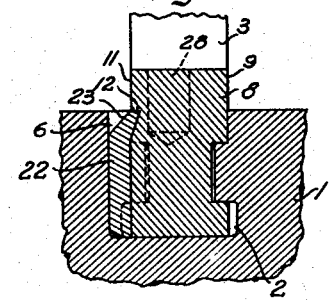
Fig. 2
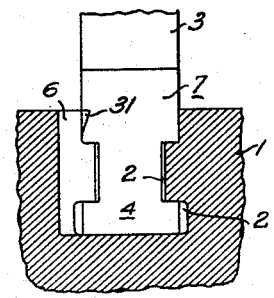
Fig. 3
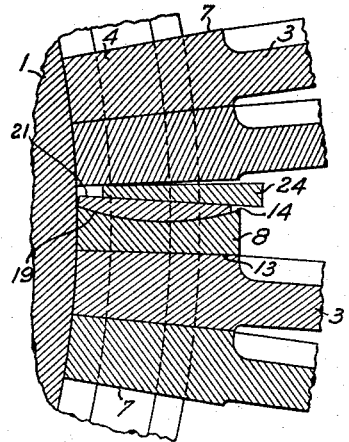
Fig. 7
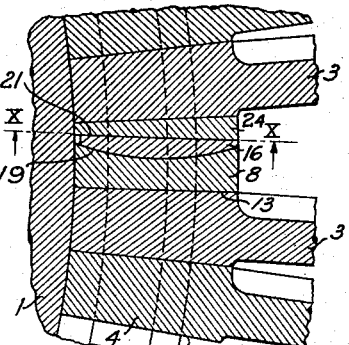
Fig. 8
Inventor
R. C. Allen
by K. S. Wyman
Attorney Patented Jan. 22, 1946

2,393,447

UNITED STATES PATENT OFFICE 2,393,447

TURBINE BLADE LOCKING APPARATUS

Robert C. Allen, Wauwatosa, Wis., assignor to Allis-Chalmers Manufacturing Company, Milwaukee, Wis., a corporation of Delaware Application May 20, 1944, Serial No. 536,464

9 Claims. (Cl. 253—77)

This invention relates to the mounting of turbine blades and other members on a rotor or other support having an undercut groove provided with a local enlargement permitting the root portion of the blades or members to be inserted in the groove and moved lengthwise thereof until the groove, except for the enlarged portion thereof, is completely filled with the root portions of the blades or members and spacing pieces, if such are employed, and has for its object the provision of a novel and improved packing means insertable in the enlarged portion of the groove between the root portions of a pair of adjacent blades or members for securely locking the blades or other members in the groove.

In the hereinabove indicated manner of mounting turbine blades or other members in grooves each containing a large number of the blades or members, it is practically impossible to attain uniformity with respect to the length of space remaining to be filled with packing pieces due to the accumulating effect of permissible tolerance in the dimensions of the root portions of the individual blades or members; the variation in the length of such remaining space amounting in some instances to as much or more than 0.2 of an inch even though the blades or members are selected to afford compensating differences in tolerance. The angle between the plane opposed surfaces presented by the spaced root portions of a pair of adjacent blades, that is the angle between the plane end surfaces of the space remaining to be filled with packing pieces, varies with the distance between such surfaces and consequently, in order to securely lock the root portions of the blades or members in the groove, it has heretofore been necessary to accurately construct special packing pieces for each such remaining space which is an extremely costly and time consuming procedure requiring a high degree of skill.

In accordance with this invention, the space remaining to be filled with packing pieces is partially filled by inserting therein a pair of relatively displaceable packing pieces or elements embodying abutting complementary concave, convex surface portions and oppositely facing plane surfaces one of which may abut the plane surface presented by the root portion of one blade and the other one of which is disposed in spaced opposed relation to the plane surface presented by the root portion of the adjacent blade or by a filler piece abutting same, the relative displacement of the pair of elements operating to vary the angularity of the said other one of the plane surfaces an amount sufficient to compensate for such change in the angle between the said plane surfaces on the root portions of the blades as may be produced by variations in the distance between such plane surfaces of as much or more than 0.2 of an inch.

The construction and application of packing pieces embodying the invention will become apparent as the disclosure progresses and particularly points out additional objects, advantages and features considered of special importance and of general application although illustrated and described as applied to the mounting of turbine blades in a circumferentially extending blade root receiving and retaining groove.

Accordingly, the invention may be considered as consisting of the various details of construction, correlations of elements and arrangements of parts as is more fully set forth in the appended claims and in the detailed description; reference being had to the accompanying drawing, in which:

Fig. 1 is a developed plan view of a partial rotor structure embodying the invention;

Fig. 2 is a transverse section taken on line II—II of Fig. 1;

Fig. 3 is a view similar to Fig. 2 with the packing pieces removed;

Fig. 4 is a view taken on line IV—IV of Fig. 1 showing only the first packing piece in place;

Fig. 5 is a view similar to Fig. 4 showing the first and second packing pieces in place;

Fig. 6 is a plan view of the assembly of Fig. 5 showing the first, second and third packing pieces in place;

Fig. 7 is a view similar to Fig. 5 showing the positions of the first and second pieces when the fourth or wedge piece is first inserted;

Fig. 8 is a view similar to Fig. 7 showing the position taken by the second packing piece when the wedge is driven to its find position;

Fig. 9 is a section taken on line IX—IX of Fig. 5; and

Fig. 10 is a section taken on line X—X of Fig. 8.

Referring to the drawing it is seen that the invention may be applied to a turbine rotor 1 embodying a circumferentially extending undercut groove 2 in which are disposed blades 3 each having an enlarged integral root portion 4 of a shape complementary to the cross-sectional configuration of the groove; the groove being provided with a local enlargement 6 permitting the root portions of the blades to be inserted into the groove and then shifted laterally to the position shown in Fig. 3 whereupon they can be moved lengthwise of the groove in either direction from the enlarged portion thereof until the groove is substantially filled with blades as shown. The root portion of each blade presents a pair of oppositely facing, radially extending plane surfaces 7 which abut the like surfaces on adjacent blades when the blades are properly assembled within the groove 2 (see Figs. 2, 4, 5 and 7); the thickness of the root portions, that is the distance between such plane surfaces, being sufficient to eliminate the use of spacing pieces between the root portions of adjacent blades. However, the cross-sectional configuration of the groove 2 and whether or not spacing pieces are employed between the root portions of adjacent blades are features of design and may be varied as desired since the only requisite in this connection is that the groove and the root portions of the blades to be inserted therein be provided with suitable coacting retaining surfaces. Consequently, a further description in this connection is deemed unnecessary for a complete understanding of the present invention.

The space remaining between the plane opposed surfaces presented by the spaced root portions of the blades adjacent opposite ends of the local enlargement 6 is filled with a plurality of packing pieces or elements (four being shown for purposes of illustration) comprising an element 8 having an edge 9 shaped to conform with the cross-sectional configuration of the right side of groove 2 and its opposite edge 11 substantially plain except for a recess 12 therein (see Fig. 2) and having a plane, radially extending surface 13 complementary to the like surfaces presented by the root portions of the blades and an oppositely facing, concave cylindrical surface 14 (see Fig. 4); an element 16 of less radial height than element 8 and having edges 17 and 18 similar to the edges 9 and 11, respectively, of element 8 except that the laterally projecting base portion of edge 17 is also of less radial height than the corresponding portion of edge 9, a convex, cylindrical surface 19 complementary to the surface 14 of element 8, and an oppositely facing plane, radially extending surface 21 complementary to the like surfaces presented by the root portions of the blades as best shown in Figs. 5 and 9; an element 22 of substantially the same size and configuration as local enlargement 6 with a portion of its top edge cut away as indicated at 23 in Fig. 10; and a wedge element 24 having the configuration shown in Fig. 10 adapting same for insertion in the space remaining between element 22, element 16 and the spaced opposed surface 7 on the adjacent blade root 4 as shown in Figs. 7 and 8. The edges of elements 16 and 24 corresponding to the edge 11 of element 8 are provided with recesses 26 and 27, respectively, similar to the recess 12 in edge 11.

The packing pieces 8, 16, 22 and 24 are preferably assembled in the space remaining between the root portions of the blades by first positioning element 8 as shown in Fig. 4, then positioning element 16 against element 8 as shown in Fig. 5, then positioning element 22 to fill the local enlargement 6 with its plane inner surface abutting the alined edges 11 and 18 of elements 8 and 16 as best shown in Fig. 6, and then positioning wedge element 24 between the plane opposed surfaces presented by element 16 and the root portion 4 of the adjacent blade as indicated in Fig. 7. In this connection, it should be noted that when wedge element 24 is inserted to the extent indicated in Fig. 7, elements 8 and 16 are both resting on the bottom of the groove with the inner or lower end of the wedge engaging both the blade root surface 7 and the opposed surface 21 of element 16 and with the upper portion of one surface of the wedge spaced from the opposite portion of the blade root surface 7. Consequently, all that has to be done in order to complete the assembly thus far described is to drive the wedge downward to the position shown in Fig. 8.

Downward movement of wedge element 24 is accompanied by an upward shifting of element 16 relative to element 8 until the plane surfaces of the wedge element are firmly engaged with the like surfaces presented by the element 16 and the root portion of the adjacent blade as shown in Fig. 8; such a relative shifting of the elements being permitted by the degree of curvature of the abutting complementary concave, convex cylindrical surfaces 14 and 19, respectively, and by the fact the laterally projecting base portion on edge 17 of element 16 is of less radial height than the corresponding projection on edge 9 of element 8 and therefore spaced from the overlying retaining portion of the groove as indicated in Fig. 9. In this connection it is preferable although not necessary that the complementary concave, convex cylindrical surfaces have a common axis lying in a horizontal plane normal to a vertical plane embodying or parallel to the plane surface of the element which is to be made cylindrically concave or convex as herein indicated and that the radius of curvature of such surfaces should not be so great as to prevent the driving of the wedge element from effecting a relative displacement of element 16.

When the parts have been assembled to the extent indicated in Fig. 8, all that remains to be done to complete the assembly is to first bend the upper reduced edge of element 22 into the groove provided by the alined recesses 12, 26 and 27 in the exposed edges of the elements 8, 16 and 22 (the corresponding side surfaces of the adjacent blades may be provided with similar recesses 31 as indicated in Figs. 10 and 2), then drill and tap a radially extending set screw receiving hole 28 in the approximate location indicated in Figs. 1 and 2, and then insert a set screw 29 therein; the screw threadedly engaging surface portions of the elements 8, 16 and 24 thereby firmly locking the wedge piece in place since the elements 8 and 16 are interlocked with the undercut portion of the groove 2. Element 22 cannot come out of the local enlargement 6 of the groove 2 because its upper edge is firmly engaged with elements 8, 16 and 24 which are in turn firmly locked in the positions shown in Figs. 1, 2 and 8 by the means just described.

Obviously, the displacement of element 16 relative to element 8 varies the angle between the plane surface 21 of element 16 and the plane surface 7 presented by the root portion of the opposed blade; the variation in such angle being sufficient to compensate for differences in the distance between the plane opposed surfaces 7 presented by the spaced root portions of the blades adjacent either end of the local enlargement 6 in groove 2 of as much or more than 0.2 of an inch. Consequently, this construction permits the use of standard packing pieces for grooves of the same size and cross-sectional configuration, that is, the elements 8, 16 and 22 may be made identical and interchangeably used in such grooves and since the angle between the surface 21 of element 16 and the opposed surface 7 of the adjacent blade root can be made constant by shifting element 16 relative to element 8, the only correction that has to be made for variations in the distance between such surfaces is either to provide wedge elements of different thickness or to use a standard wedge element and provide suitable plane surfaced filler or shim pieces (not shown) for insertion against the plane surface 7 of the blade root in the event the distance between such surface and the surface 21 of element 16 is too great to be snugly filled by the wedge 24 when driven to its final position shown in Fig. 8. In this connection, the driving of the wedge element to its final position circumferentially tightens the root portions of the blades on either side of the local enlargement to a much greater degree than has heretofore been possible with known constructions as the lack of space prevents driving caulking pieces or the like beneath or alongside the root portions of such blades.

In addition, the foregoing construction permits ready assembly of the packing pieces within the space remaining to be filled by persons with only ordinary skill thereby materially reducing both the time element and the expense heretofore considered necessary in order to properly complete the assembly of such a blade row. The invention is obviously applicable to the assembly of members other than blades in row forming relation on a suitable support, and it should therefore be understood that it is not desired to limit the invention to the exact correlations of features and construction herein shown and described for purposes of illustration as various modifications within the scope of the appended claims may occur to persons skilled in the art.

It is claimed and desired to secure by Letters Patent:

1. In a structure embodying a support having a groove adapted for interlocking engagement with the root portions of members to be mounted thereon and a plurality of members having root portions interlockingly engaged with at least one wall of said groove with the root portions of a pair of adjacent members spaced apart and presenting plane opposed surfaces, a packing means comprising a pair of elements disposed between the root portions of said adjacent members and presenting oppositely facing plane surfaces and edge projections disposed for interlocking engagement with said one wall of the groove with the edge projection of one element dimensioned to permit a limited displacement of said one element outwardly of the groove relative to the other element, said pair of elements also having engaged complementary concave, convex surfaces extending in parallel relation with respect to said oppositely facing surfaces, and a plane surfaced wedge element inserted between the plane opposed surfaces presented by said one element and the root portion of the adjacent member, said complementary surfaces having a curvature such that the insertion of said wedge element effects an angular displacement of said one element sufficient to position its plane surface in parallel relation with respect to the opposing surface of the wedge element.

2. In a structure embodying a support provided with an undercut groove having a local enlargement for retainably inserting the root portions of members in said groove and a plurality of members having their root portions retainably disposed within said groove with the enlarged portion of the groove at least partially free for the insertion of packing pieces between plane opposed surfaces presented by the root portions of a pair of adjacent members, a packing means comprising a pair of elements disposed between the root portions of said adjacent members and having oppositely facing plane surfaces opposing the plane surfaces presented by said root portions, said pair of elements also having engaged complementary concave, convex surfaces extending crosswise of said groove in parallel relation with respect to said oppositely facing plane surfaces, and a plane surfaced wedge element inserted between the plane opposed surfaces presented by one of said elements and the root portion of the adjacent member, said complementary surfaces having a curvature such that the insertion of said wedge element effects an angular displacement of said one element sufficient to position its plane surface in parallel relation with respect to the opposing surface of the wedge element.

3. In a structure embodying a support provided with an undercut groove having a local enlargement for retainably inserting the root portions of members in said groove and a plurality of members having their root portions retainably disposed within said groove with the enlarged portion of the groove at least partially free for the insertion of packing pieces between plane opposed surfaces presented by the root portions of a pair of adjacent members, a packing means comprising a pair of elements disposed between the root portions of said adjacent members and having oppositely facing plane surfaces opposing the plane surfaces presented by said root portions, said pair of elements also having engaged complementary concave, convex surfaced portions extending in parallel relation with respect to said oppositely facing plane surfaces and in concentric relation with respect to an axis extending crosswise of said groove, and a plane surfaced wedge element inserted between the plane opposed surfaces presented by one of said elements and the root portion of the adjacent member, said complementary surfaces having a degree of curvature such that the insertion of said wedge element effects an angular displacement of said one element sufficient to position its plane surface in parallel relation with respect to the opposing surface of the wedge element.

4. In a structure embodying a support provided with an undercut groove having a local enlargement for retainably inserting the root portions of members in said groove and a plurality of members having their root portions retainably disposed within said groove with the enlarged portion thereof at least partially free for the insertion of packing pieces between plane opposed surfaces presented by the root portions of a pair of adjacent members, a packing means comprising a pair of elements positioned in said groove between the root portions of said adjacent members and presenting oppositely facing plane surfaces opposing the plane surfaces presented by said root portions and offset bottom portions disposed within the undercut portion of said groove with the offset portion of one element dimensioned to permit a limited displacement of said one element outwardly of the groove relative to the other element, said pair of elements also having abutting concave, convex surfaces extending crosswise of said groove in parallel relation with respect to said oppositely facing plane surfaces, a third plane surfaced element retaining said pair of elements positioned with their offset bottom portions disposed within the undercut portion of said groove, and a plane surfaced wedge element inserted between the plane opposed surfaces presented by said one element and the root portion of the adjacent member, said complementary surfaces having a curvature such that the insertion of said wedge element effects an angular displacement of said one element sufficient to position its plane surface in parallel relation with respect to the opposing surface of the wedge element.

5. In a structure embodying a support provided with an undercut groove having a local enlargement for retainably inserting the root portions of members in said groove and a plurality of members having their root portions retainably disposed within said groove with the enlarged portion thereof at least partially free for the insertion of packing pieces between plane opposed surfaces presented by the root portions of a pair of adjacent members, a packing means comprising a pair of elements positioned in said groove between the root portions of said adjacent members and presenting oppositely facing plane surfaces opposing the plane surfaces presented by said root portions and offset bottom portions disposed within the undercut portion of said groove with the offset portion of one element dimensioned to permit a limited displacement of said one element outwardly of the groove relative to the other element, said pair of elements also having abutting concave, convex cylindrical surface portions extending in parallel relation with respect to said oppositely facing plane surfaces and in concentric relation with respect to an axis extending crosswise of said groove, a third plane surfaced element retaining said pair of elements positioned with their offset bottom portions disposed within the undercut portion of said groove, and a plane surfaced wedge element inserted between the plane opposed surfaces presented by said one element and the root portion of the adjacent member, said complementary surfaces having a degree of curvature such that the insertion of said wedge element effects an angular displacement of said one element sufficient to position its plane surface in parallel relation with respect to the opposing surface of the wedge element.

6. In a structure embodying a support provided with an undercut groove having a local enlargement for retainably inserting the root portions of members in said groove and a plurality of members having their root portions retainably disposed within said groove with the enlarged portion thereof at least partially free for the insertion of packing pieces between plane opposed surfaces presented by the root portions of a pair of adjacent members, a packing means comprising a pair of elements positioned in said groove between the root portions of said adjacent members and presenting oppositely facing plane surfaces opposing the plane surfaces presented by said root portions and offset bottom portions disposed within the undercut portion of said groove with the offset portion of one element dimensioned to permit a limited displacement of said one element outwardly of the groove relative to the other element, said pair of elements also having abutting concave, convex surfaces extending crosswise of said groove in parallel relation with respect to said oppositely facing plane surfaces, a third plane surfaced element disposed in the enlarged portion of said groove and abutting the edges of said pair of elements to retain same positioned with their offset bottom portions disposed within the undercut portion of said groove, said third element having a deformable top edge portion, and said pair of elements having edge recesses providing a groove adapted to receive the deformable top edge portion of said third element, and a plane surfaced wedge element inserted between the plane opposed surfaces presented by said one element and the root portion of the adjacent member, said complementary surfaces having a curvature such that the insertion of said wedge element effects an angular displacement of said one element sufficient to position its plane surface in parallel relation with respect to the opposing surface of the wedge element, and a locking screw threadably engaging contiguous portions of said wedge and pair of elements.

7. In a mounting for a row of turbine blades or other members including a pair of adjacent members having root portions spaced apart and presenting plane opposed surfaces, a packing means comprising a pair of elements disposed between the root portions of said adjacent members and having oppositely facing plane surfaces opposing the plane surfaces presented by said root portions, said pair of elements also having engaged complementary concave, convex surfaces extending in parallel relation with respect to said oppositely facing plane surfaces, and a plane surfaced wedge element inserted between the plane opposed surfaces presented by one of said elements and the root portion of the adjacent member, said complementary surfaces having a curvature such that the insertion of said wedge element effects an angular displacement of said one element sufficient to position its plane surface in parallel relation with respect to the opposing surface of the wedge element.

8. In a mounting for a row of turbine blades or other members including a pair of adjacent members having root portions spaced apart and presenting plane opposed surfaces, a packing means comprising a pair of elements disposed between the root portions of said adjacent members and having oppositely facing plane surfaces opposing the plane surfaces presented by said root portions, said pair of elements also having engaged complementary concave, convex surfaces extending crosswise of said row in parallel relation with respect to said oppositely facing plane surfaces, and a plane surfaced wedge element inserted between the plane opposed surfaces presented by one of said elements and the root portion of the adjacent member, said complementary surfaces having a degree of curvature such that the insertion of said wedge element effects an angular displacement of said one element sufficient to position its plane surface in parallel relation with respect to the opposing surface of the wedge element.

9. In a mounting for a row of turbine blades or other members including a pair of adjacent members having root portions spaced apart and presenting plane opposed surfaces, a packing means comprising a pair of elements disposed between the root portions of said adjacent members and having oppositely facing plane surfaces opposing the plane surfaces presented by said root portions, said pair of elements also having engaged complementary concave, convex cylindrical surface portions extending in parallel relation with respect to said oppositely facing plane surfaces and in concentric relation with respect to an axis extending transversely of said row, and a plane surfaced wedge element inserted between the plane opposed surfaces presented by one of said elements and the root portion of the adjacent member, said complementary surfaces having a degree of curvature such that the insertion of said wedge element effects an angular displacement of said one element sufficient to position its plane surface in parallel relation with respect to the opposing surface of the wedge element.

ROBERT C. ALLEN.